Patented Dec. 26, 1922.

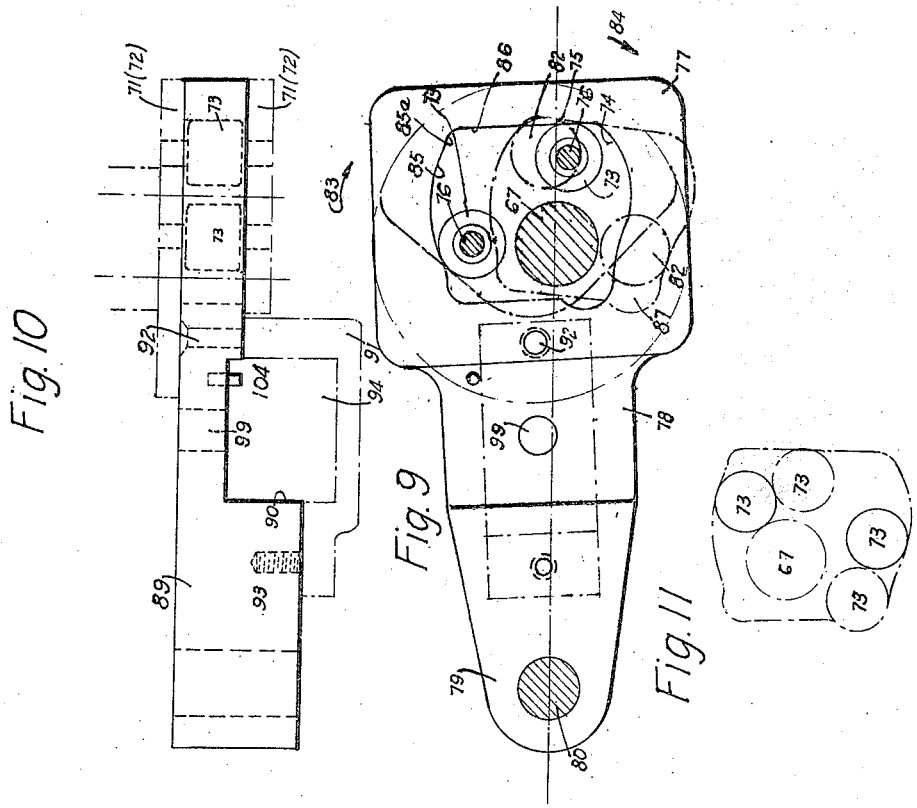

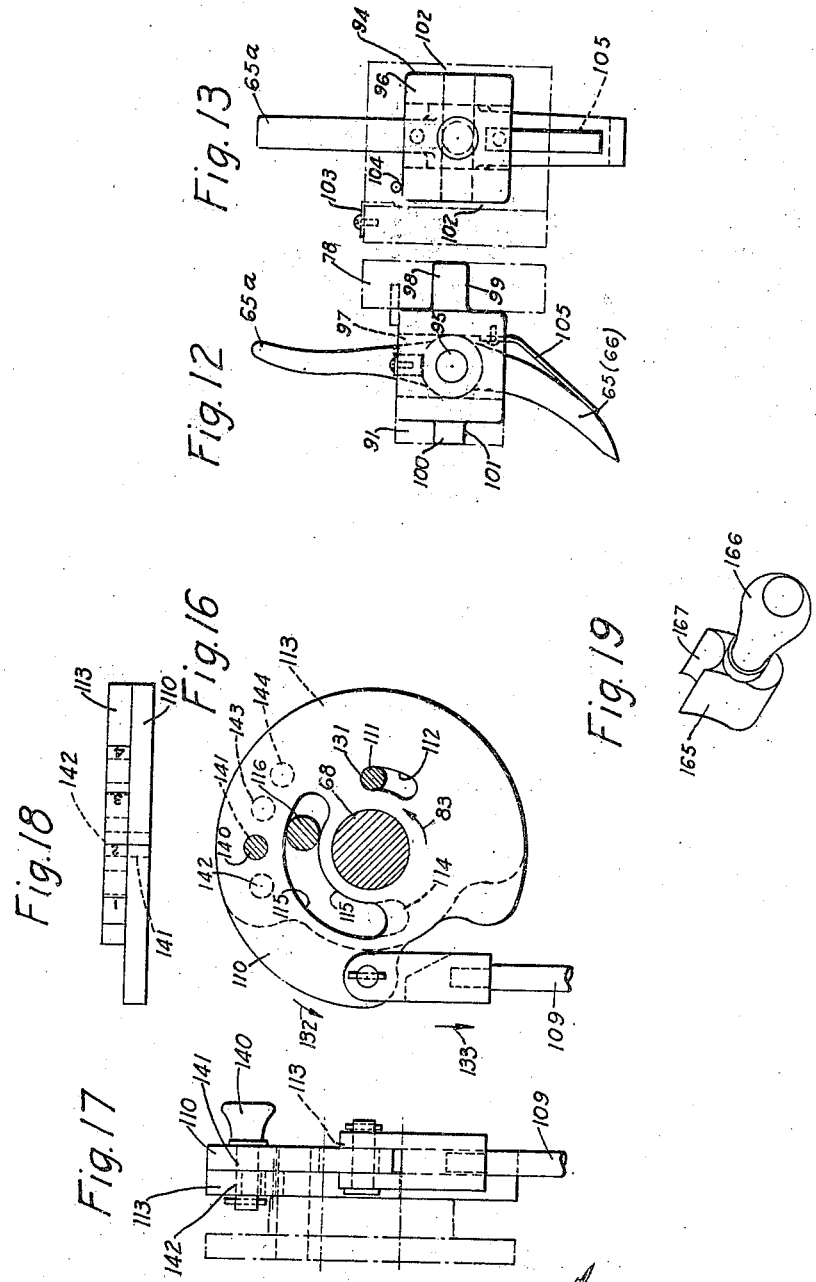

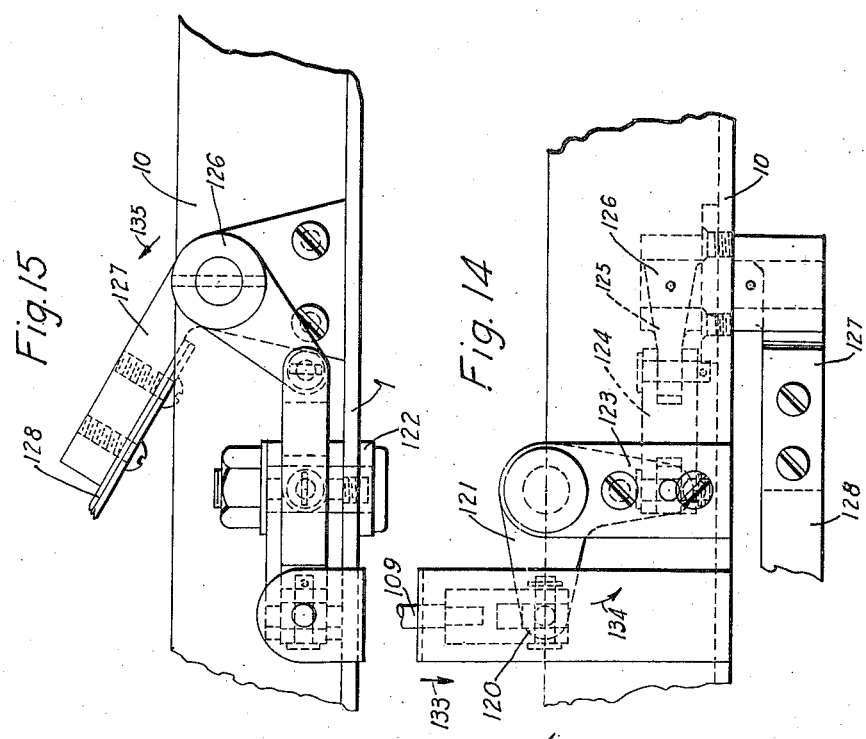

1,440,138

UNITED STATES PATENT OFFICE.

MICHELE G. DE SIMONE, OF STAPLETON, NEW YORK, ASSIGNOR TO JOHN E. SMITH'S SONS CO., A CORPORATION OF NEW YORK.

BUTTER-SERVING MACHINE.

Application filed July 30, 1919. Serial No. 314,286.

*To all whom it may concern:*

Be it known that I, MICHELE G. DE SIMONE, a citizen of the United States of America, residing at Stapleton, county of Richmond, Staten Island, N. Y., have invented certain new and useful Improvements in Butter-Serving Machines, of which the following is a specification.

This invention relates to food serving machines.

An object of the invention is the provision and construction of a food serving machine formed of parts capable of being maintained in completely sanitary condition.

A further object of the invention is the provision of a food serving machine in which the operating parts are positively operated and regulated.

In the more preferred forms of the invention applicable for serving butter, ice-cream and similar plastic foodstuff, the machine comprises a suitable container for containing the foodstuff in bulk, a plunger for advancing the foodstuff through the discharge opening of the container and manually or otherwise operable means for actuating the plunger, such plunger operating means comprising self-balanced elements constructed and arranged to obviate the need of lubricant.

A further object of the invention is the provision of means for feeding the foodstuff in bulk into the machine at any stage of its operation.

In the most preferred form of the invention, the serving machine comprises an outer casing of heat insulating quality, a movable support, a plurality of containers removably mounted on such movable support, a plunger arranged to be successively positioned in such containers, compartments suitably positioned within the casing for receiving suitable substances for maintaining the foodstuff at a suitable temperature, a rod removably related to the plunger, operable means for positively advancing the plunger in any container to project the butter or similar foodstuff through its discharge opening and means for severing a portion of the projected portion of the foodstuff. Preferably, the actuating mechanism for advancing the plunger is regulatable in its effective extent of advance for a full stroke of the operating handle. The operating mechanism is preferably constructed and arranged whereby an initial, definite extent of movement of the operating handle in the one direction is effective in advancing the content of the container and a subsequent definite extent of movement of the operating handle in the one direction is effective in severing the desired amount of the expelled content to insure entire absence of interference between the expelling and severing of the food. The feature of arranging the effective movements of the handle in the advancing stroke of the handle and an idle return stroke enables the handle to be left by the operator either in its upper or lower position and without causing any unsevered foodstuff to project out of the casing and beyond the effective region of the temperature.

Further features and objects of the invention will be more fully understood from the following description and accompanying drawings, in which—

Fig. 3 is a detail vertical section showing the removable mounting of a container on the rotating table of the machine, and its locking device;

Fig. 4 is a detail top plan view of Fig. 3;

Fig. 5 is a top plan view of the plunger;

Fig. 6 is a vertical sectional view of the plunger;

Fig. 9 is a detail side elevation on an enlarged scale showing the cam operating parts in their upper position;

Fig. 10 is a top plan view of Fig. 9;

Fig. 11 is a view similar to Fig. 9, but showing the cam operating parts in their lower position;

Fig. 12 is a detail elevation of one of the pawls of the actuating mechanism of the plunger;

Fig. 13 is a side elevation of Fig. 12;

Fig. 14 is a detail vertical elevation of the operating mechanism of the severing means;

Fig. 15 is a detail top plan view of Fig. 14;

Fig. 16 is a detail side elevation of the operating mechanism of the severing means, and of the adjustable regulator;

Fig. 17 is an end elevation of Fig. 16;
Fig. 18 is a top plan view of Fig. 16; and
Fig. 19 is an isometric view of an insert element for rendering the severing mechanism ineffectual.

Figure 1:
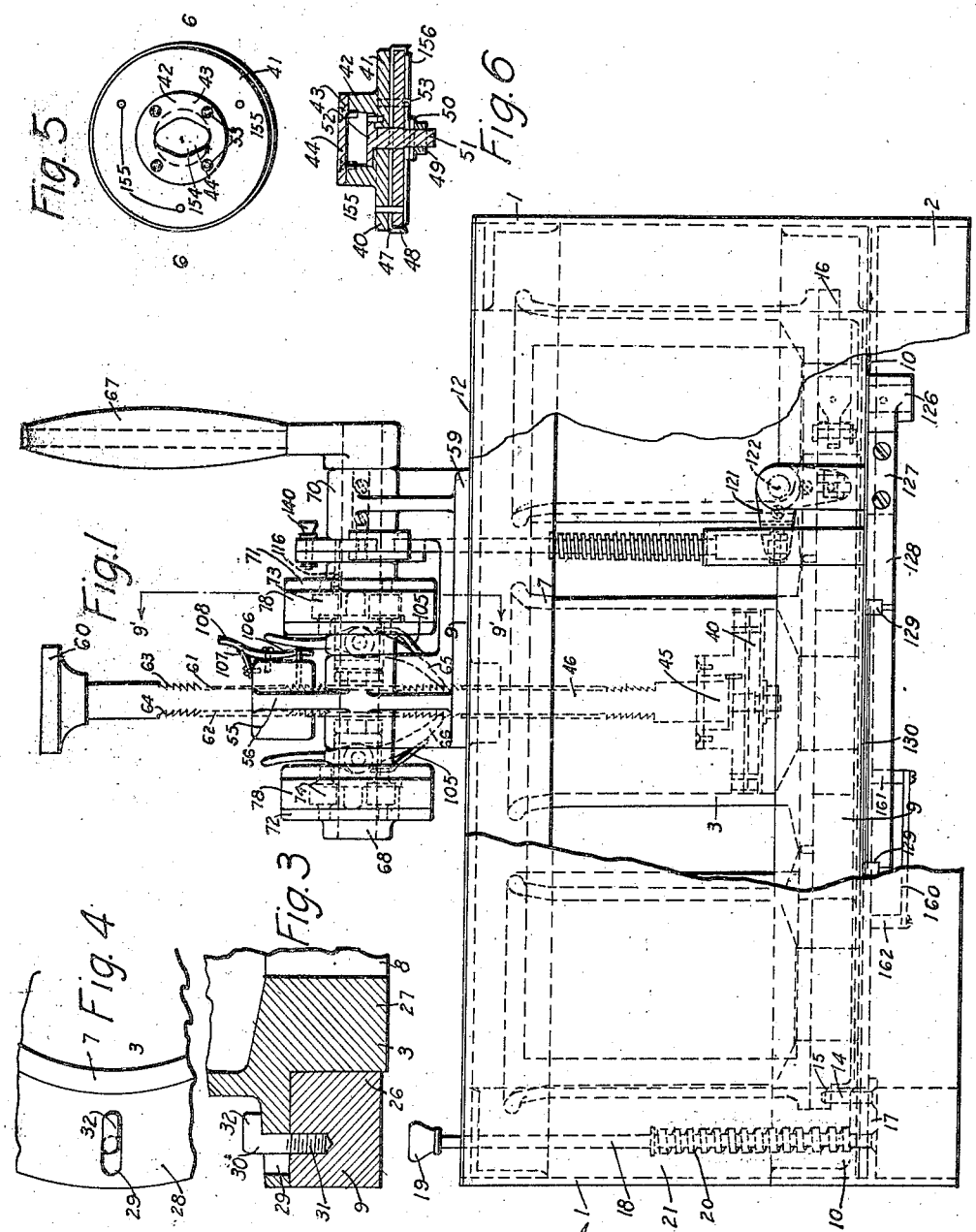
Fig. 1 is a front elevation, partly cut away in vertical elevation to show certain inner parts.
Figure 2:
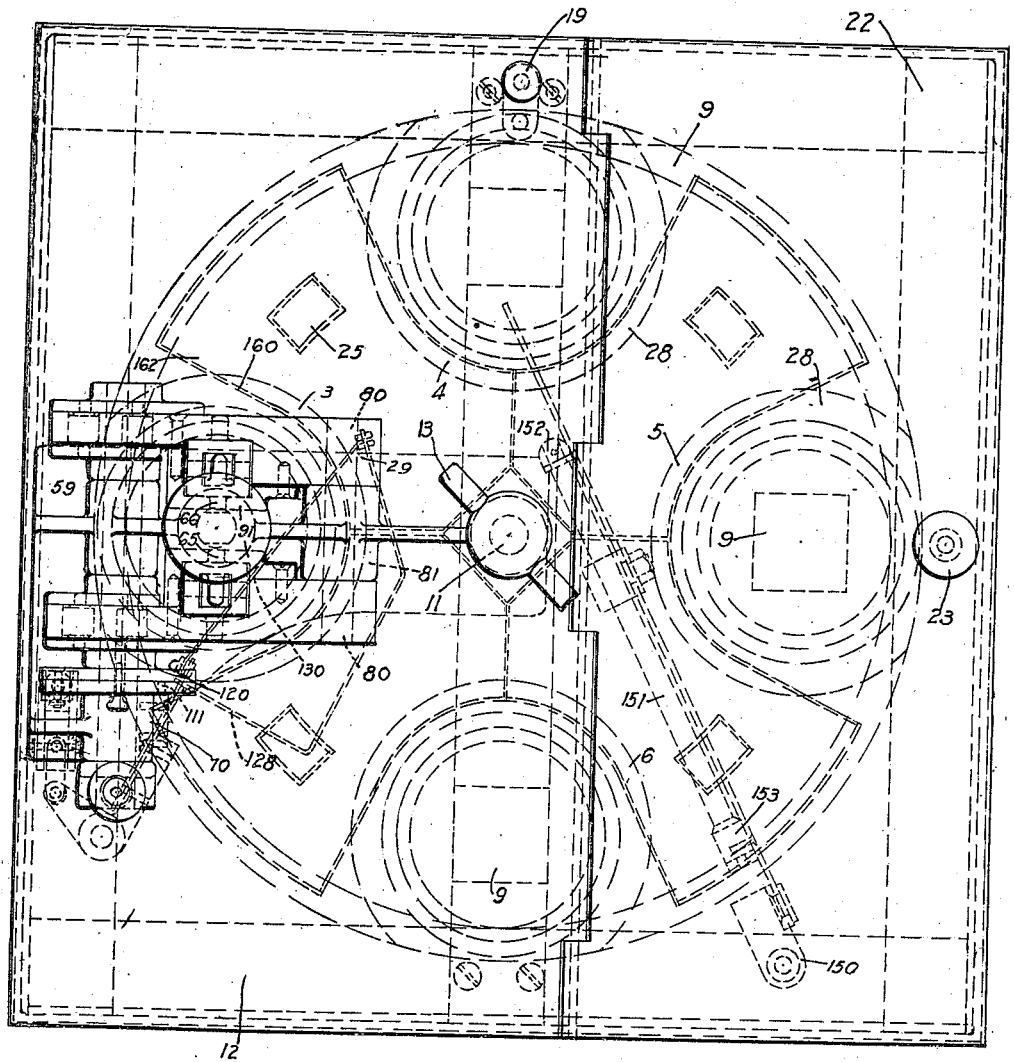
Fig. 2 is a top plan view of Fig. 1.
Figures 7, 8:
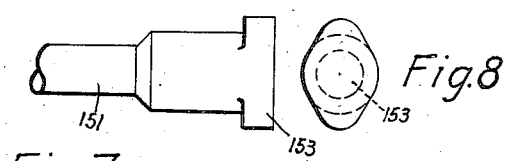
Fig. 7 is a detail side elevation of the toe of the extractor.
Fig. 8 is an end elevation of Fig. 7.

Referring to Figs. 1 and 2, the serving machine is shown comprising the outer casing 1, of suitable exterior contour, and formed of suitable material for heat-insulating the interior of the casing. The casing 1 is provided with suitable feet 2.

The serving machine is provided with a suitable number of containers and of suitable configuration determined by the particular use, and in the specific embodiment shown there are four containers 3, 4, 5, 6, having substantially cylindrical inner and outer configurations and somewhat flared outwardly at its upper end 7, see Fig. 1. The lower end of each container is provided with a suitable discharge opening 8, see Fig. 3.

The containers are mounted on the table 9 shown as rotatably mounted within and disposed adjacent the bottom 10 of the casing 1. The table 9 is provided with an upwardly extending, centrally fixed rod 11, see Fig. 2, projecting through the top 12 of the casing and provided with the hand-hold 13, to afford manual operation of the table exteriorly of the casing 1. The table 9 is also provided with suitable locking means, such as comprising the locking pin 14, see Fig. 1, adapted to be received within the opening 15, in the flange 16 of the table 9; said pin 14 is mounted on the arm 17, fixed to the rod 18 projecting upwardly through the casing 1 and having the knob 19 disposed above the top 12 of the casing 1 for manual operation exteriorly of the casing. The rod 18 is normally tensioned by the expansive spring 20, shown coiled about the rod 18, having its lower end engaging the inner face of the bottom 10 of the casing and its upper end abutting the stop pin 21 carried by the rod 18.

In the particular form of the invention shown in the drawing, the machine is especially adapted for serving butter, for which purpose the containers may be of cylindrical contour and provided with a square discharge opening 9, for the service of the usual square patties of butter. Such containers 3, 4, 5, 6 are conveniently arranged at substantially quadrant positions, and accordingly the locking recesses 15 are four in number and may be disposed substantially in radial alignment with the centers of the respective containers.

The casing 1 is provided with a hinged cover 22, having the knob 23, and suitably hinged to the fixed portion of the top 12 to afford charging the foodstuff in bulk into the container within access of the opening of the cover, or for removal or replacement. Such arrangement affords charging the machine at any time, of any container, even while the plunger is operating.

Disposed within the casing 1 and between the respective containers 3, 4, 5, 6 I have provided the sectional compartments 25, adapted to contain ice or other suitable cooling medium. The particular contour of each of the four refrigerating compartments may be varied, as will be understood, and in the particular form shown in the drawings, see Fig. 2, the contour conforms to the shape of the containers, the shape of the supporting table 9 and to provide a central clearance through which extends the operating rod 11. The cooling compartments 25 are also preferably of suitable form at their inward, manually engaging faces to be self-locking in position about the containers.

Preferably, see Figs. 3 and 4, each container 3 is removably positioned in the table 9, for which purpose the table 9 is provided with the perforation 26 adapted to receive the protruding end 27 of the container 3 snugly fitting the face of the perforation 26. Adjacent the protruding end 27, each container 3 may also be provided with the lateral flange 28 constructed to firmly seat and retain the container on the table 9. The flange 28 is preferably provided with a recess 29 for receiving a locking pin 30 adjustably tapped, as by threading 31, in the table 9 and provided with a head 32 adapted to frictionally lock the container 3, shown in locking position in Fig. 3. Upon rotating the head 32 through a half-turn, the head 32 is brought into register with the recess 29, enabling the container 3 to be raised from its seated position in the table 9.

At a suitable location on the casing 1 is arranged the operating mechanism of the plunger for projecting the butter through the discharge opening of the container, and in the particular form of the invention shown in the drawings, I have mounted the operating mechanism of the plunger on the top 12 of the casing 1.

The plunger, as shown in Figs. 1, 5 and 6, conforms to the inner contour of any container 3, and in this instance, is circular, in cross section. Preferably, the plunger 40 comprises an upper plate 41 having the boss 42 provided with the retaining plate 43 having the elongated slot or recess 44 of suitable contour for freely receiving the foot 45, see Fig. 1, of the plunger rod 46. The plunger 40 is provided with the packing 47 having the peripherally depending edge portion 48, adapted to self-sealingly and frictionally engage the inner face of any container 3. The packing 47 is removably positioned on the plate 40 by means of the retaining plate 49 held in position by the locking pin 50 and nut 51. The locking pin 50 is preferably provided with the head 52 positioned at the bottom of the recess 44 of the boss 42 and having the positioning pin 53. Such removability of the plunger from its rod and the separability of its parts subjected to contact with the foodstuff enables the same to be readily taken apart and cleansed.

The plunger rod 46 extends through its positioning block 55, see Fig. 1, carried by the bracket 56, extending upwardly from the base 59 of the plunger operating mechanism. The rod 46 is provided at its upper end with the removable head 60.

The plunger rod 46 is provided with the suitably disposed flattened faces 61, 62, on which are respectively disposed the sets of ratchet teeth 63, 64. Such sets of ratchet teeth are preferably arranged symmetrically relative to the principal axis of the plunger rod, extending in this instance substantially coincident with the longitudinal axis of the rod, and coacting with such ratchet teeth 63, 64, are provided the pawls 65, 66 preferably mounted to be self-balanced under actuation of the handle 67 to progressively advance the plunger 40 downwardly within any container 3.

In the specific form of the plunger actuating mechanism, as illustrated in the drawings, the handle 67 is mounted on the shaft 68, see Figs. 1 and 9, said shaft 68 being mounted in the central bearing 69 and lateral bearing 70, each supported by suitable brackets on the base 59. The disks 71, 72 are keyed, or otherwise rotationally fixed, to the shaft 68; each disk 71 (72) carries spaced cam rollers 73, 74, respectively coacting with a cam 75, see Fig. 9. The disks 71 (72) are arranged in pairs and provided with suitable recesses for receiving the oppositely extending studs 76 of the respective rollers 73, 74.

The cam 75 is shown of the inside cam type and formed in the head 77 of the oscillating lever 78, pivotally mounted at its rearward end 79 on the fixed stud 80, carried in the rearward bearing 81, see Fig. 2, supported by the base 59. The levers 78 carry the pawls 65, 66, respectively, arranged upon downward movement of the levers 78, under action of the handle 67, to advance the plunger 45, as set forth more fully hereinafter.

The cam 75 is provided with an effective cam face comprising the curved depression 85, see Fig. 9, eccentric relative to the center of the shaft 68, coacting with the roller 74, upon downward movement of the handle 67 in the direction of the arrow 83, to depress the lever 78 rotationally in the direction of the arrow 84. During such movement of the cam roller 74, the cam roller 73 glides through the correspondingly curved depression 85 of the cam face 75, until it reaches its terminal portion 85ª, of the cam face 77, (see Fig. 11), at which stage upon continued downward movement of the handle 67, the roller 73 glides through the arcuate depression 85 and the roller 74 through the corresponding arcuate depression 87, each concentric with the center of the shaft 68, whereby such continued downward movement of the handle is ineffectual in oscillating the levers 78. The final positions of the rollers 73, 74, are indicated by dotted outline in Fig. 11. During the stage of oscillation of the handle and stage of rest of the levers 78, the handle is effectual in operating the severing means, as set forth more fully hereinafter.

Such arrangement of the distinct periods of operation of the advancement of the plunger and the operation of the severing means during the downward oscillation of the handle, attains the expelling of the butter through the discharge opening prior to the operation of the severing means and an idle upward movement of the handle, thereby insuring complete absence of interference of the expelling and severing means, and permitting the operator to leave the handle either in its downward or its upward position without liability of causing any portion of the butter to protrude beyond the discharge opening of the container and beyond the effective region of the cooling medium within the casing.

The pawls 65, 66, are preferably mounted in the respective levers 78, 78, in self-balanced relation therewith, and for this purpose such mounting means provides rotation on a substantially horizontal axis and a limited transverse, rotational movement to accommodate the travel of each pawl 65, 66 in a substantially vertical direction, downwardly, in seated engagement with a ratchet tooth, while its lever 78 is operated through an arc of a circle having its center coincident with the axis of the pivot stud 80.

As one form of my preferred construction of the pawl mounting means, I have cut away the rearward relatively thick portion 89 of each lever 78 at 90, to provide a substantially right-angled recess, completed by the right-angled recess, completed by the right-angled plate 91, detachably connected at one end by the screw 92 and at the other end by the screw 93 to the body of the lever 78, thereby affording the closed recess 94, in which the mounting means proper of each pawl 65, 66 is located. As indicated in Figs. 12 and 13, each pawl 65 (66) is pivotally mounted on central studs 95, extending in suitable, oppositely disposed, bearing openings in the block 96, said block 96 being provided with the vertical recess 97 through which the body of the pawl 65 extends. The block 96 is bodily rotationally mounted by means of the main stud 98, seated in the bearing recess 99 of the body of the lever 78, see also Figs. 9 and 10, and by means of the shorter stud 100 seated in the bearing opening 101, of the angled plate 91.

As appears from Fig. 13, the lateral contour of the mounting block 96 relative to the lateral contour of the recess 94 provides for the oppositely disposed clearances 102, 102, to afford limited rotational movement of the block 96 on its studs 98, 100, retarded by the flat spring 103, and positively limited by the pin 104, tapped in the body of the lever 78.

Each pawl 65 (66) is provided with a spring 105, resiliently holding the effective end of the pawl toward its set of ratchet teeth 61 (62).

The centering block 55 is provided with suitable means for restraining the plunger rod 46 from upward movement, upon the upward oscillation of the pawls 65, 66, see Fig. 1, comprising the holding pin 106, normally held by the spring 107 in engagement with a ratchet tooth. The spring 107 is loosely mounted on the centering block 55, and is provided with the manipulating finger 108 adapted to be manually pressed to withdraw the positioning pin 106, when it is desired to manually withdraw upwardly the plunger rod 46. In such manual withdrawal of the plunger rod 46, the tips 65ª of the respective pawls 65, 66, as well as the finger 108 of the retaining spring 107, are pressed in opposed directions, whereupon the rod 46 is free to be slid manually through its centering block 55.

Upon downward oscillation of the operating handle 67, and therewith downward oscillation of the respective levers 78, thereby actuating each pawl 65, 66, downwardly while in engagement with their respective ratchet teeth 61, 62, the plunger rod 46 is correspondingly forced downwardly and the plunger 40 correspondingly advanced in the container 3 to project the butter or other suitable foodstuff through its discharge opening 8, preparatory to the operation of the severing means. Suitably connected to the shaft 68 is provided a link 109 for operating the severing means under control of the operating handle 67. The link 109 is shown mounted at its upper end on the arcuate plate 110, suitably mounted on the shaft 68 to provide for the operation of the link 109 during the final stage of downward movement of the operating handle 67. Such arrangement comprises, in the specific form illustrated, the arcuate plate 110 loosely mounted on the shaft 68, pin 111 fixed to the bearing 70, or other fixed support (see Fig. 2) and projecting into the short slot 112 of the arcuate plate 110, see Fig. 16; the plate 113 also loosely mounted on the shaft 68, and provided with the long slot 115, said plate being provided with a registering long slot 115 and a pin 116 projecting through both slots 114, 114 and fixedly carried by the immediate disk 71 (see Fig. 1). In Fig. 16, these parts are shown in their initial position, i. e., when the operating handle is in its upper position. During the initial stroke of the handle, to effect the advance of the plunger, the pin 116 moved from its position shown in full lines in Fig. 6 to its position at the opposite end of the slot 115, during which movement the plates 110, 113 are idle. Upon continued movement of the handle and therewith the shaft 68, and the disks 71 and pin 116, the pin 116 encounters the end of the slot 115 thereby rotating the plate 110 until the pin 111 abuts the end of its slot 112, bringing the plate 110 to rest, and thereby determining the final downward movement of the handle 67.

As appears in Figs. 14 and 15, the link 109 is connected to one arm 120 of the bell crank 121, pivotally mounted at 122 on the casing 1 of the machine. The other arm 123 of the bell crank lever 121 is connected by the link 124 to the upper arm 125 of the bell crank lever 126, pivotally mounted and projecting through the recess extending through the bottom 10 of the casing 1, its lower arm 127 being connected with the spring frame 128 (see Fig. 2) provided with the positioning lugs 129 for receiving the respective ends of the severing wire 130, or equivalent knife or other suitable severing means.

Thus, upon operation of the handle 67 and oscillation of the shaft 68 in the direction of the arrow 83, see Fig. 16, during the final extent of its downward movement, determined by the pin 111 and its slot 112, the link 109 is actuated downwardly in the direction of the arrow 133 (see also Fig. 14), thereby rotating the bell crank 121 in the direction of the arrow 134, the bell crank 126 in the direction of the arrow 135, and thereby rotating the severing wire 138 anticlockwise, as viewed in Fig. 2, to traverse the discharge opening of the container 3, and thereby sever a portion of the bulk of the butter, projecting through the discharge opening 8 of the container 3.

In the specific construction illustrated in the drawing as indicated above, the severing mechanism is combined with a regulator for adjusting the extent of the portions severed by the severed means from the bulk of the foodstuff, although, it will be understood, that the severing mechanism is constructed to be arranged without such regulator. Thus, in the specific embodiment shown, upon clamping or otherwise fixing the plate 110 to plate 113, as by means of the pin 140 extending through an opening 141 in the plate 110 and through the registering opening 142 in the plate 113, or the equivalent, by forming the plate 110 integrally with the plate 113, as will be understood.

For adjustable regulation, the plate 110 and the plate 113, as indicated in Figs. 16, 17 and 18, are separate plates and adjustably connected to one another, as by providing the plate 113 with a plurality of openings 142, 143, 144, arranged similar to the opening 141 on an arc the center of which is coincident with the center of the shaft 68, thereby enabling the pin 140, positioned in the opening 141 in the plate 110 to be extended into any one of the registering openings 142, 143, 144, etc., to determine the effective stroke of oscillation of the pawl advancing mechanism, and thereby determine the amount of butter or foodstuff advanced through the discharge opening.

For serving for butter or similar foodstuff, the regulating openings 141, 142, 143, 144 are chosen to determine definite sizes of patties of butter and the regulator disks 110, 113 may be calibrated at their upper, side by side, edges, with indications as indicated in Fig. 18, similar to scale markings, for indicating the adjustment of the regulator. In commercial forms of my machine, conforming to the construction illustrated in the drawings, the scale indication "1" represents a size of patty of one-thirtieth of a pound, and similarly the scale indications "2," "3" and "4" represent patties of sizes respectively one thirty-fifth, one fortieth and one forty-fifth of a pound. Similar openings may be provided for similar definite sizes of the severed portions of the foodstuff discharged from the machine.

The discharged severed portions are received on a suitable dish or equivalent position below the bottom of the casing which is provided with a discharge opening disposed below the discharge opening of the container.

Upon fully discharging the food in bulk from any container, the plunger rod 46 is withdrawn upwardly, freeing its toe from contact with the plunger 40 until clear of the upper end 7 of the container 3, whereupon the locking bar 19 is depressed to unlocking position and by means of the handhold 12 of the table 9 is rotated to bring the desired other container in position below the plunger mechanism. The plunger 40 is retained in the container by means of its sealing fit, and a new plunger, or the former plunger after cleansing, as desired, is placed in position in the top of the next container, the plunger rod 46 depressed in contact therewith, whereafter the machine is prepared for further operation.

I have provided means for extracting the plunger 40 from its lodged position at the bottom of the emptied container, and as one form of such extracting means I have shown the arm 150, pivoted at one side of the casing to extend over the opening of the cover 9 when the cover 9 has been raised; said arm 150 is universally carried by the rod 151 provided at its upper end 152 with a suitable hand-hold and at its opposite end 153 with an elongated toe, adapted to be received within the correspondingly elongated recess 44 and upon slight rotation to be caught within the overlapping edges 154 of the plate 43, and upon manual application of force upwardly the plunger 40 is readily withdrawn upwardly and thence out of the container.

It will be noted that the plunger 40 is provided with the air vents 155, see Figs. 5 and 6, leading from the upper face 41 of the plunger to the lower face, on which is positioned the lower sealing lever 156, which vents are closed upon advancement of the plunger 40 under action of its rod 46, but when the plunger 40 is withdrawn upwardly by the extractor 152—153, the lower lever 156 being held by plastic butter or the like, the vents 155 are opened thereby breaking the vacuum under the plunger enabling the plunger to be readily withdrawn.

I have provided a guide for the frame 128 of the severing means, namely, the guide plate 160 positioned to and extending below the bottom 10 of the casing 1, by means of the lugs 161, 162, as indicated in Figs. 1 and 2.

It will be noted that the table locking means operated by the rod 19, serves to locate any particular container in operative position below the plunger actuating mechanism.

When it is desired to render ineffectual the severed means, I have provided the insert 165, shown greatly enlarged in Fig. 19, having the handle 166 and provided with the curve 167 adapted to be positioned within the slot 112 of the plate 110, thereby filling said slot 112, and serving to limit the desired stroke of the handle 67 of the machine to operate solely the levers 89 to advance the plunger rod 46, but not operating the link 109 of the severing means.

Whereas I have described my invention by reference to specific forms thereof, it will be understood that many changes and modifications may be made without departing from the spirit of the invention, as defined by the appended claims.

I claim:

1. In a food serving machine, a container for receiving food in bulk, said container having an open bottom, a plunger for said container, a rod, means for removably connecting said rod to said plunger by relative rotation of said rod and said plunger and discharging means located below said container.

2. In a food serving machine, a container for receiving food in bulk, said container having an open bottom, a plunger for said container, a rod, means for removably connecting said rod to said plunger, said connecting means comprising a continuous flange extending at an appreciable distance from the effective face of said plunger, said plunger being provided with a recess disposed within the contour of said flange and means for retaining an end of said rod within said recess and discharging means located below said container.

3. In a food serving machine, a container for receiving food in bulk, a plunger for said container, a handle, means for mounting said handle to be moved in a direction transversely to the direction of movement of the plunger in said container, means connecting said handle with the rod of said plunger, said last named means comprising an element engaging said rod and means for mounting said element to permit movement of said element substantially parallel to the movement of said rod.

4. In a food serving machine, a container for receiving food in bulk, a plunger for said container, a lever, means for pivotally mounting said lever to be moved in a direction transversely to the direction of movement of the plunger in said container, an element connecting said lever with the rod of said plunger, and means for mounting said element on said lever to permit movement of said element relative to said lever.

5. In a food serving machine, a container for receiving food in bulk, a plunger for said container, a lever, means for pivotally mounting said lever, pawl means carried by said lever, means for mounting said pawl means on said lever to permit movement of said pawl means relative to said lever in a direction transverse to the pivotal movement of said lever, a rod for said plunger and ratchet teeth on said rod and coacting with pawl means.

6. In a food serving machine, a container for receiving food in bulk, a plunger for said container, a rod for said plunger, said rod being provided with a plurality of spaced sets of ratchet teeth, a plurality of levers, means for pivotally mounting said levers, pawls respectively carried by said levers and means for mounting said pawls on said levers to permit movement of the same in a direction transverse to the pivotal movement of said lever.

7. In a food serving machine, a container for receiving food in bulk, a plunger for said container, a rod for said plunger, said rod being provided with a plurality of spaced sets of ratchet teeth disposed symmetrically relative to the principal axis of the said rod extending in the direction of movement of said rod, a plurality of levers, means for pivotally mounting said levers, pawls respectively carried by said levers, and means for mounting said pawls on said levers to permit movement of the same in a direction transverse to the pivotal movement of said lever.

8. In a food serving machine, a container for receiving food in bulk, a plunger for said container, a rod for said plunger, and a lever for actuating said rod, said lever comprising a handle, a shaft, roller means carried by said shaft and a cam controlling said lever and coacting with said roller means.

9. In a food serving machine, a container for receiving food in bulk, a plunger for said container, a rod for said plunger, ratchet teeth disposed on said rod, a lever, a pawl carried by said lever, a cam controlling said lever, a shaft, roller means carried by said shaft and coacting with said cam and means for oscillating said shaft.

10. In a food serving machine, a container for receiving food in bulk, means for expelling foodstuff through the discharge opening of said container, means for severing the discharge portion of the foodstuff and means for operating said expelling means and said severing means successively.

11. In a food serving machine, a container for receiving food in bulk, a plunger for said container, a rod for said plunger, means for advancing said rod, said advancing means comprising a handle, means for limiting the extent of movement of said handle, and means for regulating the extent of movement of said rod upon the movement of said handle between said limiting means, said regulating means comprising a plurality of arms and means for adjustably connecting said arms to one another.

12. In a food serving machine, a container for receiving food in bulk, a plunger for said container, a rod for said plunger, means for advancing said rod, said advancing means comprising a handle, means for limiting the extent of movement of said handle, and means for regulating the extent of movement of said rod upon the movement of said handle between said limiting means, said regulating means comprising a plurality of arms, means for adjustably connecting said arm to one another and correlated markings disposed on said arms.

13. In a food serving machine, a rotatable table, a plurality of containers removably mounted on said table, locking means for said table, a plunger for any of said containers, a rod removably connected with said plunger, said rod being provided with oppositely disposed sets of ratchet teeth, pawls coacting respectively with said sets of ratchet teeth, a plurality of levers disposed on opposite sides of said rod, means for pivotally mounting said pawls respectively on said levers to permit movement of said pawls in two transverse directions of rotation, an inside cam controlling each of said levers oppositely disposed rollers controlling each of said cams, a shaft fixedly carrying said rollers, a handle controlling said shaft, a plate carried by said shaft and provided with a slot, a pin cooperation with said slot to limit the extent of movement of said shaft, a second plate movably mounted on said shaft, said plates having a plurality of registering openings, a pin adapted to be positioned within an opening in one of plates and another of said registering openings in said other plate, severing means disposed adjacent the discharge opening of one of said containers, and means controlled by said shaft for operating said severing means at a period succeeding the period of operation of said pawls.

14. In a food serving machine, a container for receiving food in bulk, a plunger, a rod for said plunger, means for mounting said rod to move in a rectilinear direction, a pawl, and means for self-adjustingly mounting said pawl on said lever.

In testimony whereof I have signed this specification this 24th day of July 1919.

MICHELE G. De SIMONE.